May 5, 1964  K. WILFERT  3,131,439
SASH WINDOW, PARTICULARLY LOWERABLE WINDOW FOR MOTOR VEHICLES
Filed Nov. 13, 1961

INVENTOR.
KARL WILFERT
BY *Dicke and Craig*
ATTORNEYS.

May 5, 1964 K. WILFERT 3,131,439
SASH WINDOW, PARTICULARLY LOWERABLE WINDOW FOR MOTOR VEHICLES
Filed Nov. 13, 1961 2 Sheets-Sheet 2

INVENTOR.
KARL WILFERT
BY Dicke and Craig
ATTORNEYS.

United States Patent Office 3,131,439
Patented May 5, 1964

3,131,439
SASH WINDOW, PARTICULARLY LOWERABLE WINDOW FOR MOTOR VEHICLES
Karl Wilfert, Stuttgart-Degerloch, Germany, assignor to Daimler-Benz Aktiengesellschaft, Stuttgart-Unterturkheim, Germany
Filed Nov. 13, 1961, Ser. No. 151,766
Claims priority, application Germany Nov. 15, 1960
11 Claims. (Cl. 20—52)

The present invention relates to a slidable window, particularly to a lowerable window in motor vehicles, which is guided and supported in rails provided with seals.

The present invention aims at improving the sealing tightness of such windows. In particular, it is to be possible in accordance with the present invention to compensate for the tolerances of the dimensions of the windowpanes and of sealing elements, unavoidable in series-production of motor vehicles, as well as for the normal wear and tear of such sealing elements. Good sealing of the windows in motor vehicles is also of great importance with a view to the reduction of the wind noises at high speeds.

The present invention essentially consists in embedding or securing the seals to one or several profile-shaped moldings or sectional strips which are movable with respect to the guide rails in the direction toward the windowpane surfaces, and which are pressed in the direction toward one or several surfaces of the windowpane by means of springs arranged between the guide rails and the profile strips or moldings. These profile strips may be, for instance, of U-shaped cross section and may be movably arranged in the direction toward the end surface of the windowpane. In this manner, the seals are pressed resiliently against the end surfaces of the windowpanes whereby the sealing of the windowpane is considerably improved. This type of resilient seal is particularly advantageous for the upper seal of the motor vehicle windows because a tight seal is assured also in case the window has been cranked up inadvertently to within only 1–2 millimeters from the upper edge.

Instead of being U-shaped, the profile strips or moldings may also be angularly shaped in cross section and may be movably arranged in the direction of the end face and/or of a lateral surface of the windowpane. It is particularly advantageous to provide in such case two profile strips or moldings of angular cross section within a guide rail in such a manner that one surface of one strip overlaps a surface of the other strip, and both sectional or profile strips together constitute a structure of variable width and having U-shaped cross section. The two profile strips or moldings may be connected with one another in a form-locking manner by projections of one of the strips engaging into corresponding recesses of the other strip. The free surfaces of the angularly-shaped strips are thereby appropriately pressed against the lateral surfaces of the windowpane and the overlapping surfaces against the end face of the windowpane.

In accordance with a further development of the present invention, the springs to be utilized may preferably be undulated leaf springs, or strips from an elastic material, such as rubber, foam material, and the like. A textile fabric or plastic plush material may appropriately be used as seal. Such seals may have U-shaped cross section and be embedded into the profile strips or sectional moldings. It is also possible, however, to cover the profile strips with seals. A particularly favorable seal is obtained if the seals themselves are constructed of profiled or sectional cross section and are elastic both by reason of their shape and by reason of their material properties and characteristics.

Accordingly, it is an object of the present invention to provide a window sealing arrangement, especially for lowerable windows in motor vehicles which obviates the inadequacies and shortcomings of the prior art constructions.

It is another object of the present invention to provide a sealing arrangement of the type described hereinabove, particularly for lowerable windows in motor vehicles which is simple in construction, easy to assemble, and reliable in performing its function.

Still a further object of the present invention resides in the provision of a sealing arrangement for lowerable windows, particularly lowerable windows in motor vehicles which is relatively inexpensive, utilizes few parts and assures a tight seal under all conditions.

Still a further object of the present invention resides in the provision of a sealing arrangement for a lowerable motor vehicle window which assures the tight seal by the particular construction and arrangement of the seal even if the window is not tightly closed.

These and other objects, features and advantages of the present invention will become more obvious from the following description when taken in connection with the accompanying drawing which shows, for purposes of illustration only, two embodiments in accordance with the present invention, and wherein FIGURE 1 is a partial cross sectional view of one embodiment of the present invention provided with a U-shaped profile strip and a U-shaped seal;

Figure 1:
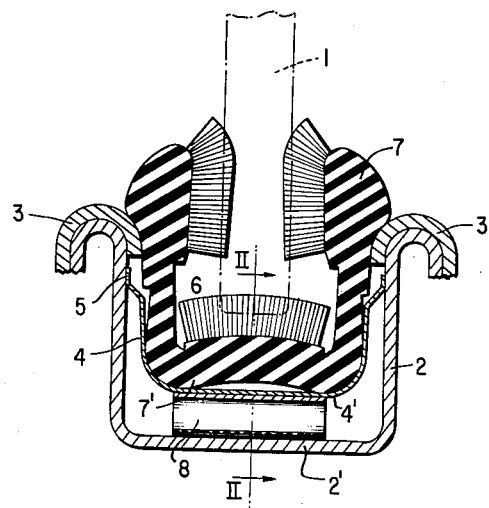
Figure 2:
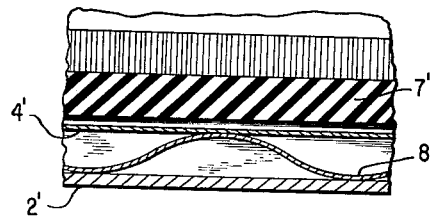
FIGURE 2 is a cross-sectional view taken along line II—II of FIGURE 1.

Referring now to the drawing wherein like reference numerals are used throughout the various views to designate corresponding parts, and more particularly to FIGURES 1 and 2, the windowpane 1 shown therein is guided along the edge thereof in a U-shaped rail 2 which is connected within the area of its rims to the outer body panel elements 3 of the vehicle. Inserted into the guide rail 2 is a profile strip or molding 4 also of U-shaped cross section which is laterally supported with its angularly-bent outer ends 5 at the U-shaped rail 2 which, however, is otherwise movably arranged in the direction toward the end face 6 of the windowpane 1. In this embodiment, the seal 7, which consists partly of a plastic plush material, is also of U-shaped configuration. This seal 7 rests, with its transverse leg portion 7', against the transverse leg portion 4' of the profile strip 4 and, with its outer side surfaces, against the upper edge of the rail 2 or of the enclosure 3 thereof. An undulated leaf spring 8 is inserted between the transverse leg portion 4' of the profile strip 4 and the transverse leg portion 2' of the guide rail 2 which presses the profile strip 4 and therewith also the seal 7, in the direction toward the end face 6 of the windowpane 1. The lateral parts of seal 7 are so constructed and shaped that the plush hair provided thereat abut against the lateral surfaces of the pane 1.

Figure 3:
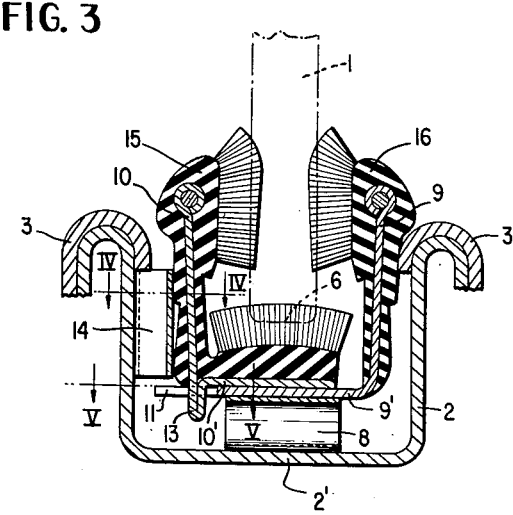
FIGURE 3 is a partial cross sectional view of another embodiment of the present invention provided with angularly shaped profile strips.
Figure 4:
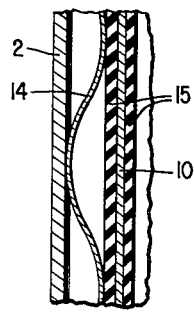
FIGURE 4 is a cross-sectional view taken along line IV—IV of FIGURE 3.
Figure 5:
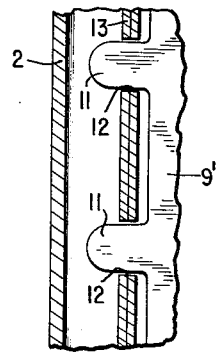
FIGURE 5 is a cross-sectional view taken along line V—V of FIGURE 3.

In the embodiment illustrated in FIGURES 3 to 5, two angularly-shaped profile strips 9 and 10 are provided for pressing the seal against the windowpane 1. These profile strips 9 and 10 are movable both in the direction toward the end face 6 of the windowpane 1 and in the direction toward the lateral surfaces thereof. The two strips or moldings 9 and 10 are so arranged within the U-shaped guide rail 2 that the surfaces thereof extend parallel to the surfaces of the guide rail 2. In this arrangement, the surfaces 9' and 10' of the profile strips 9 and 10 which are parallel to the transverse leg portion 2' of the guide rail 2 thereby overlap so that these two strips, in turn, also form together a U-shaped structure of variable width. The two strips or moldings 9 and 10 are form-lockingly connected with each other by nose means or projections 11, which are provided along the edge of strip surface 9' and engage in recesses 12 provided within the web portion 13 obtained by doubling or folding back upon itself a portion of profile strip 10.

The U-shaped structure consisting of profile strips 9 and 10 is again pressed against the end face 6 of the windowpane 1 by a spring 8 which is supported on the transverse leg portion 2' of the guide rail 2. In addition thereto, a further spring 14 which is provided between one of the lateral surfaces of the guide rail 2 and the surface of the profile strip 10 disposed parallel thereto, is operable to press the profile strip 10 together with the seal 15 secured thereto against the lateral surface of the windowpane 1 and, consequently, the windowpane 1 with its oppositely disposed side surface against the profile strip 9 inclusive the seal 16. In this embodiment, the profile strips 9 and 10 are directly covered with the seals 15 and 16. Again, these seals 15 and 16 consist partly of plastic plush material and have a profiled cross section so as to be elastic both by reason of their shape and by reason of their material properties.

While I have shown and described several embodiments in accordance with the present invention, it is obvious that the same is not limited thereto, but is susceptible of many changes and modifications within the spirit and scope thereof. For instance, instead of leaf springs, elastic strips made of rubber, foamed material, or the like may be used as springs. Also, such springs may be provided on all the three sides of the U-shaped guide rails. Moreover, an arrangement is also feasible within the scope of the present invention in which each of these two or more springs could press profile strips arranged independently of each other and each provided with separate appropriate seals against the windowpane.

Thus, it is obvious that the present invention is susceptible of many changes and modifications within the spirit and scope thereof, and I therefore do not wish to be limited to the details shown and described herein, but intend to cover all such changes and modifications as are encompassed by the scope of the appended claims.

I claim:

1. A slidable window, particularly lowerable window in motor vehicles, which is guided and supported in rails provided with seals, comprising supporting rail means, sectional strip means in said rail means, seal means for said window at said strip means, said strip means being movable with respect to said rail means in the direction toward a windowpane surface, and spring means between said rail means and said strip means for pressing said seal means against at least one surface of the windowpane, said sectional strip means being of substantially angularly-shaped cross section and being adapted for movement in the direction toward at least one of the end face and side surfaces of the windowpane, two of said angularly-shaped strip means being so arranged within a respective rail means that one surface of one said two strip means overlaps a surface of the other strip means and both of said strip means form together a substantially U-shaped structure, the leg portion of said U-shaped structure being subject to movement toward each other under the influence of one of said spring means.

2. A slidable window, particularly lowerable window in motor vehicles, which is guided and supported in rails provided with seals, comprising supporting rail means, sectional strip means in said rail means, seal means for said window at said strip means, said strip means being movable with respect to said rail means in the direction toward a windowpane surface, and spring means between said rail means and said strip means for pressing said seal means against at least one surface of the windowpane, said sectional strip means being of substantially angularly-shaped cross section and being adapted for movement in the direction toward at least one of the end face and side surfaces of the windowpane, two of said angularly-shaped strip means being so arranged within a respective rail means that one surface of one said two strip means overlaps a surface of the other strip means and both of said strip means form together a substantially U-shaped structure, one of said strip means being provided with nose means engaging into recesses provided in the other strip means.

3. A slidable window, particularly lowerable window in motor vehicles, which is guided and supported in rails provided with seals, comprising supporting rail means, sectional strip means in said rail means, seal means for said window at said strip means, said strip means being movable with respect to said rail means in the direction toward a windowpane surface, and spring means between said rail means and said strip means for pressing said seal means against at least one surface of the windowpane, said sectional strip means being of substantially angularly-shaped cross section and being adapted for movement in the direction toward at least one of the end face and side surfaces of the windowpane, two of said angularly-shaped strip means being so arranged within a respective rail means that one surface of one said two strip means overlaps a surface of the other strip means and both of said strip means form together a substantially U-shaped structure, one of said strip means being provided with nose means engaging into recesses provided in the other strip means, the free surfaces of said angularly-shaped strip means being pressed against the side surfaces of the windowpane and the overlapping surfaces against the end face of said windowpane.

4. A slidable window, particularly lowerable window in motor vehicles, which is guided and supported in rails provided with seals, comprising supporting rail means, sectional strip means in said rail means, seal means for said window at said strip means, said strip means being movable with respect to said rail means in the direction toward a windowpane surface, and spring means between said rail means and said strip means for pressing said seal means against at least one surface of the windowpane, said sectional strip means being of substantially angularly-shaped cross section and being adapted for movement in the direction toward at least one of the end face and side surfaces of the windowpane, two of said angularly-shaped strip means being so arranged within a respective rail means that one surface of one said two strip means overlaps a surface of the other strip means and both of said strip means form together a substantially U-shaped structure, the free surfaces of said angularly-shaped strip means under the influence of said spring means being pressed toward the side surfaces of the windowpane and the overlapping surfaces toward the end face of said windowpane.

5. A slidable window, particularly lowerable window in motor vehicles according to claim 4, wherein said spring means is constituted by strips of elastic material.

6. A slidable window, particularly lowerable window in motor vehicles according to claim 4, wherein said seal means is made of textile material.

7. A slidable window, particularly lowerable window in motor vehicles according to claim 4, wherein said seal means is made of synthetic plush material.

8. A slidable window, particularly lowerable window in motor vehicles according to claim 4 wherein each of said two angularly shaped strip means has two further surfaces paralleling said overlapping surfaces, one of said two further surfaces carrying a portion of said seal means, the other of said two further surfaces being in contact with said spring means.

9. A slidable window particularly lowerable window in motor vehicles according to claim 4, wherein said spring means is constituted by undulated leaf springs.

10. A slidable window, particularly lowerable window in motor vehicles according to claim 4, wherein said seal means comprises spaced members, one of said members having an angular cross section including a portion extending substantially parallel to said overlapping surfaces.

11. A slidable window, particularly lowerable window in motor vehicles according to claim 4, wherein said seal means comprise a plurality of portions in contact with said strip means, said seal means having a profiled cross section such as to be elastic as a result of both the shape and the properties of the material of said seal means.

References Cited in the file of this patent

UNITED STATES PATENTS

| | | |
|---|---|---|
| 830,896 | Harrah | Sept. 11, 1906 |
| 1,680,315 | Bailey | Aug. 14, 1928 |
| 1,976,808 | Schunk | Oct. 16, 1934 |
| 2,204,630 | Spraragen | June 18, 1940 |

FOREIGN PATENTS

| | | |
|---|---|---|
| 586,765 | France | Jan. 9, 1925 |
| 704,459 | Great Britain | Feb. 24, 1954 |
| 742,568 | Great Britain | Dec. 30, 1955 |